United States Patent [19]

Yang et al.

[11] Patent Number: 5,553,515
[45] Date of Patent: Sep. 10, 1996

[54] BICYCLE PEDAL

[76] Inventors: Young M. Yang, Ku-ri-si, Su-tak-dong 556-5, Kyung-ki-do, Rep. of Korea; Young H. Kim, 7465 Columbia Ct., Woodbury, Minn. 55125

[21] Appl. No.: 101,537

[22] Filed: Aug. 2, 1993

Related U.S. Application Data

[63] Continuation-in-part of Ser. No. 16,774, Feb. 11, 1993, abandoned.

[51] Int. Cl.⁶ ........................................... G05G 1/14
[52] U.S. Cl. ................. 74/594.3; 74/594.4; 74/594.5
[58] Field of Search ..................... 74/594.4–594.6; 482/57, 61, 63

[56] References Cited

U.S. PATENT DOCUMENTS

| | | | |
|---|---|---|---|
| 558,463 | 4/1896 | Bascom. | |
| 558,464 | 4/1896 | Bascom. | |
| 578,130 | 3/1897 | Adams. | |
| 579,732 | 3/1897 | Adams. | |
| 626,045 | 5/1899 | Behan. | |
| 1,714,134 | 5/1929 | Poyser. | |
| 2,533,011 | 12/1950 | Hill | 74/594.1 |
| 3,081,645 | 3/1963 | Bergfors | 74/594.1 |
| 3,563,541 | 2/1971 | Sanquist | 482/57 |
| 4,446,754 | 5/1984 | Chattin | 74/594.3 |
| 4,519,271 | 5/1985 | Chattin | 74/594.3 |
| 4,625,580 | 12/1986 | Burt | 74/594.4 |
| 4,651,590 | 3/1987 | Thun | 74/594.1 |
| 4,882,945 | 11/1989 | Trevizo | 74/594.3 |

FOREIGN PATENT DOCUMENTS

| | | | |
|---|---|---|---|
| 450230 | 3/1913 | France | 74/594.5 |
| 18090 | 2/1914 | France | 74/594.5 |
| 797965 | 5/1936 | France | 74/594.4 |
| 872872 | 6/1942 | France | 74/594.4 |
| 876494 | 11/1942 | France | 74/594.4 |
| 937354 | 8/1948 | France | 74/594.3 |
| 2623769 | 6/1994 | France | 74/594.3 |
| 402759 | 3/1943 | Italy | 74/594.4 |
| 129765 | 1/1929 | Switzerland | 74/594.4 |
| 1827 | of 1838 | United Kingdom | 74/594.4 |
| 473114 | 11/1937 | United Kingdom | 74/594.3 |

*Primary Examiner*—Vinh T. Luong
*Attorney, Agent, or Firm*—Merchant, Gould, Smith, Edell, Welter & Schmidt, P.A.

[57] ABSTRACT

A device attached to a crank arm of, for example, a bicycle, which increases the effective crank length through the power phase of the crank arm stroke using rotary motion. The maximum effective crank length is provided proximate the 12 o'clock position and it is reduced to a minimum proximate the 6 o'clock position to maximize power output from a rider or other operator. The device includes an axle eccentrically mounted on a crank arm, the axle defining an axis of rotation which is offset from the distal end of the crank arm and which preferably lies along or within a range with respect to the longitudinal axis of the crank arm. A housing is rotatably attached to the axle with the housing encompassing the axle and rotating about the axis defined by the axle.

17 Claims, 4 Drawing Sheets

BICYCLE PEDAL

RELATED APPLICATIONS

This application is a continuation-in-part of U.S. patent application Ser. No. 08/016,774, filed on Feb. 11, 1993, now abandoned.

FIELD OF THE INVENTION

The present invention relates to devices designed to increase the effective crank length of crank arms. More particularly, the present invention relates to a device which, when attached to the crank arm of a bicycle or other vehicle, increases the effective crank length through the power phase of the stroke.

BACKGROUND OF THE INVENTION

In a standard bicycle or other crank-powered vehicle, a crank arm is rotated to provide the force required to propel the vehicle. The most common example is a bicycle crank arm connected to a chainring, which rotates a chain, which, in turn, rotates a cog operatively connected to a drive wheel.

The length of crank arms can be increased to allow the rider to transfer more torque through the crank arms for a given amount of force exerted by taking advantage of the longer lever provided by a longer crank arm. In fact, crank arms for many bicycles can be purchased in lengths varying from 165 millimeters up to and past 185 millimeters, generally in 2.5 millimeter increments. Elite cyclists will, on occasion, change the crank arm length of their bicycles to provide for more effective power transfer in events which are either hilly or flat, or which require a steady effort, such as a time trial event.

Longer crank arms do, however, have drawbacks. The average cyclist is unlikely to change their crank arms to obtain a different effective crank length due to the difficulties associated with disassembling portions of the drivetrain. In addition, the constant use of longer crank arms has been associated with increased rates of injury among cyclists because of the corresponding larger range of motion induced by longer crank arms in the cyclists' knees and other joints.

Attempts have been made to provide devices which vary the effective crank length during the pedal stroke to obtain an increase in the effective crank length during the power phase of the stroke. Most of the attempts have focused on converting the rotating motion of the crank arm and attached pedal to linear motion to provide the increase in effective crank length.

One example of such an attempt is disclosed in U.S. Pat. No. 4,625,580 to Burt. In that device, the pedal incorporates a floating body and cam mechanism which moves the body of the pedal along a linear path during rotation of the pedal. The linear motion is defined by a combination of slots and pins, with the pins riding in the slots to guide the body of the pedal during rotation. That linear motion of the pedal body provides an increase in effective crank length in the Burt device.

U.S. Pat. No. 4,882,945 to Trevizo discloses a device for transferring the rotary motion of the pedal relative to the crank to linear motion in which the effective crank length is increased. During rotation, portions of the Trevizo crank arms telescope to provide the increased effective crank length.

U.S. Pat. Nos. 4,446,754 and 4,519,271 to Chattin also disclose a telescoping crank arm and cam device which provide increased effective crank lengths through the use of telescoping crank arms during rotation.

U.S. Pat. No. 1,714,134 to Poyser discloses a crank arm including a longitudinal slot formed in its end. The slot receives a set of rotating elements to which the axle of the pedal is attached. As the crank arm is rotated, the pedal moves along the longitudinal slot to increase the effective crank arm length. The effective crank length provided by the Poyser device is at its maximum at the 3 o'clock position and a minimum at the 6 o'clock position.

All of the attempts at providing an increase in effective crank length described above incorporate linear or longitudinal motion into the system. The use of linear motion to increase effective crank length is problematic because it results in increased friction. Wear associated with that friction will eventually lead to premature failure of those devices.

Furthermore, devices such as the Poyser device provide a maximum crank length at the 3 o'clock position which does not take into account the advantages associated with maximizing the effective crank length proximate the 12 o'clock position.

The device disclosed in U.S. Pat. No. 626,045 to Behan describes a device used in one attempt to increase effective crank length using purely rotary motion. As described there, the Behan device includes an attachment for a crank arm which provides an outer stationary housing in which a pair of rotating inner disks are housed. The pedal is attached to the rotating inner disks and, therefore, rotates during rotation of the crank arm.

Because the inner disks to which the pedal is attached are freely rotating during use, the Behan device provides a minimum effective crank length at the 12 o'clock position and a maximum effective crank length at the 6 o'clock position. That particular combination is the least desirable for maximizing power transfer between the rider and crank arms because the effective crank length is minimized for a majority of the power phase of the pedal stroke.

As a result, a need exists for a device which can provide an increase in effective crank length through purely rotary motion and which provides a maximum effective crank length proximate the 12 o'clock position and a minimum effective crank length proximate the 6 o'clock position to maximize power transfer through the crank arms.

SUMMARY OF THE INVENTION

The present invention provides a device for extending the effective crank length of a crank arm used to propel a crank-driven vehicle and which does so through purely rotary motion. Furthermore, the present invention provides maximum effective crank length at or proximate the 12 o'clock position and a minimum effective length at or proximate the 6 o'clock position to maximize power output from the rider.

A preferred embodiment of the device according to the present invention includes an axle eccentrically mounted on a crank arm in the threaded hole provided for attaching a standard pedal axle to the crank arm. The axle defines an axis of rotation which is offset from the distal end of the crank arm and which preferably lies along or near a longitudinal axis of the crank arm.

A housing is rotatably attached to the axle in the preferred device, with the housing encompassing the axle and rotating about the axis defined by the axle.

Also in the preferred device, a platform is attached to the housing, the platform being adapted to cooperate with the foot of a rider during rotation of the crank arm. The preferred platforms define a plane which is preferably tangential to the rotation of the housing about the axis.

In the preferred embodiments, the present invention is adapted for attachment to standard crank arms. Alternatively, however, the present invention could be incorporated into the design of a special crank arm which would include an eccentrically mounted axle at its distal end.

The advantages and features of devices constructed according to the present invention will be apparent upon reviewing the detailed description below along with the drawings illustrating various preferred embodiments of devices according to the present invention.

BRIEF DESCRIPTION OF THE DRAWINGS

FIG. 8 is an enlarged cross-sectional view of a fifth preferred embodiment of a device according to the present invention.

DETAILED DESCRIPTION OF THE PREFERRED AND ALTERNATE EMBODIMENTS

Although preferred embodiments of the present invention are discussed below as limited to bicycle pedals, it should be understood that the present invention can be used in many other applications in which power is transferred through the rotation of a crank arm by the feet or hands of a person. Examples of such applications include, but are not limited to, winches and other such devices, aircraft powered through the use of a crank mechanism, watercraft powered through the use of a crank mechanism, and, essentially, any application in which rotary motion is used to impart power and in which a portion of the rotational stroke is used to provide a significant portion of the overall power supplied to the system through a crank arm.

Figures 1, 2, 3:
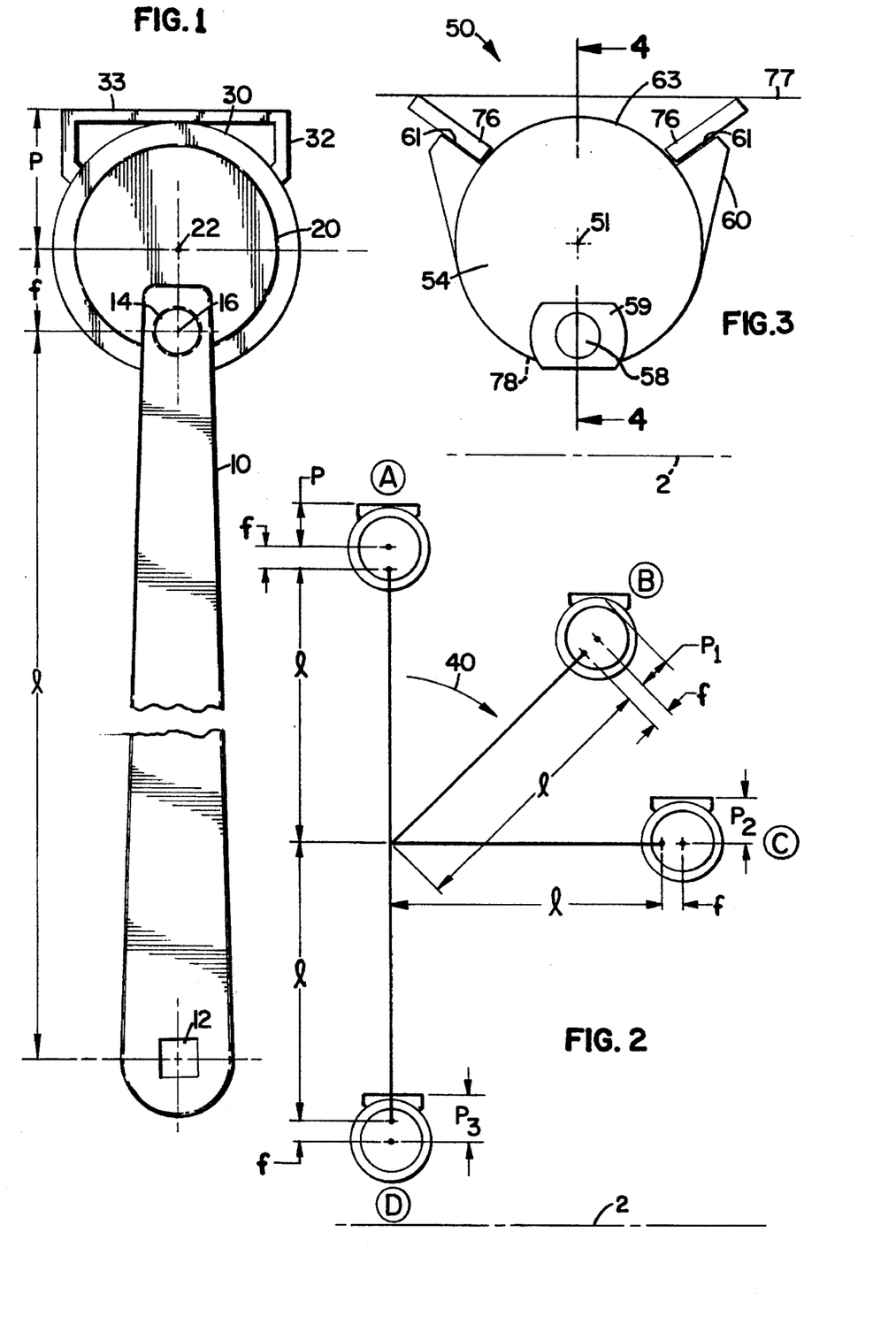
FIG. 1 is a side view of a first preferred embodiment of the device according to the present invention with the crank arm at the 12 o'clock position.
FIG. 2 is a schematic diagram of the operation of the present invention at a variety of positions between 12 o'clock and 6 o'clock.
FIG. 3 is an end view of a second preferred embodiment of a device according to the present invention.

Referring to FIG. 1, a crank arm 10 is depicted to which axle 20 is eccentrically mounted. Crank arm 10 preferably has a standard design which includes a square bore 12 in a proximal end and a threaded bore 14 adapted to receive the threaded end of a standard pedal axle (not shown). The square bore 12 receives the end of a spindle (not shown) as found on standard bottom brackets used in the vast majority of bicycles currently manufactured.

Axle 20 preferably includes a threaded stud (not shown) which threads into the bore 14 and is opposed by a threaded plug 16. The opposing forces between the threaded stud of the axle 20 and the threaded plug 16 are used to ensure that axle 20 remains fixed relative to the crank arm 10.

Alternatively, the axle 20 can be fixed relative to crank arm 10 by a variety of mechanical means. The primary consideration should be the elimination of rotation relative to the crank arm 10 by axle 20. Axle 20 defines an axis of rotation 22 seen as a point in the side view of FIG. 1.

Housing 30 is attached to axle 20 and rotates about the axis 22 defined by axle 20. In the preferred embodiments, housing 30 includes a platform 32 mounted thereon having an outer force engaging surface 33 which is adapted to cooperate with the foot of a rider as the crank arm 10 is rotated.

The crank arm 10 has a fixed effective length denoted by the letter l as shown in FIG. 1. That fixed effective length l extends from the center of square bore 12 to the center of the threaded bore 14.

The axle 20 is eccentrically mounted in threaded bore 14 to move the axis 22 out from the center of threaded bore 14 and along a longitudinal axis of the crank arm 10. The distance between the center of threaded bore 14 and axis 22 is defined as a first distance denoted by the letter f. As a result, the housing 30 rotates about axis 22 rather than the center of bore 14 as in standard pedal designs.

Housing 30 and platform 32 combine to provide an additional distance, defined as a second distance denoted by the letter p. That distance is determined by the radial distance from axis 22 to the platform 32, which is a function of the diameter of the axle 20 and the thickness of the housing 30.

At the 12 o'clock position, as shown in FIG. 1, the effective crank length is the sum of the distances l, f, and p. In the preferred embodiment, the effective crank length is always at a maximum at the 12 o'clock position.

Referring now to FIG. 2, which is a schematic diagram depicting the total effective crank length and the relationship between the distances l, f and p during four positions in the pedal stroke. During the pedal stroke the crank arms rotate in the direction 40.

As discussed above and depicted in FIG. 2, the effective crank length is at a maximum at the 12 o'clock position indicated by the letter A. This maximum effective crank length corresponds to the beginning of the power phase of the pedal stroke as defined in the Background section and provides the rider with maximum leverage to rotate the crank arm due to the increased leverage.

As the pedal rotates to position B which is approximately the 1'30" position, the effective crank length is indicated by the sum of the distances l, f and $p_1$. At position B, however, the distance along the longitudinal axis of the crank arm represented by the letter $p_1$ is less than the distance p because of rotation of the housing relative to the crank arm. As such, the effective crank length is somewhat diminished as the crank arm rotates through the power phase as shown.

At position C, the effective crank length is the sum of the distances l and f with the distance $p_2$ having no effect on the effective crank length as it is completely tangential to the rotation of the crank arm.

As the crank arm is further rotated to the 6 o'clock position at D, it can be seen that the effective crank length is, in fact, minimized as the effective crank length is the sum of the distances represented by l and f minus the distance $p_3$.

As the crank arm is rotated back to the 12 o'clock position it will be understood that the effective crank length at the 9 o'clock position, for example, is the sum of the distances l and f as in the 3 o'clock position. Rotation from the 6 o'clock position to the 12 o'clock position will not be described in detail as it will be understood that rotation during that phase of the pedal stroke provides little, if any, torque to the drive train.

As a result, devices according to the present invention provide a combination of maximum effective crank length at the 12 o'clock position which begins the power phase of the stroke and minimum effective crank length at the 6 o'clock position which begins the recovery phase of the stroke.

Figure 4:
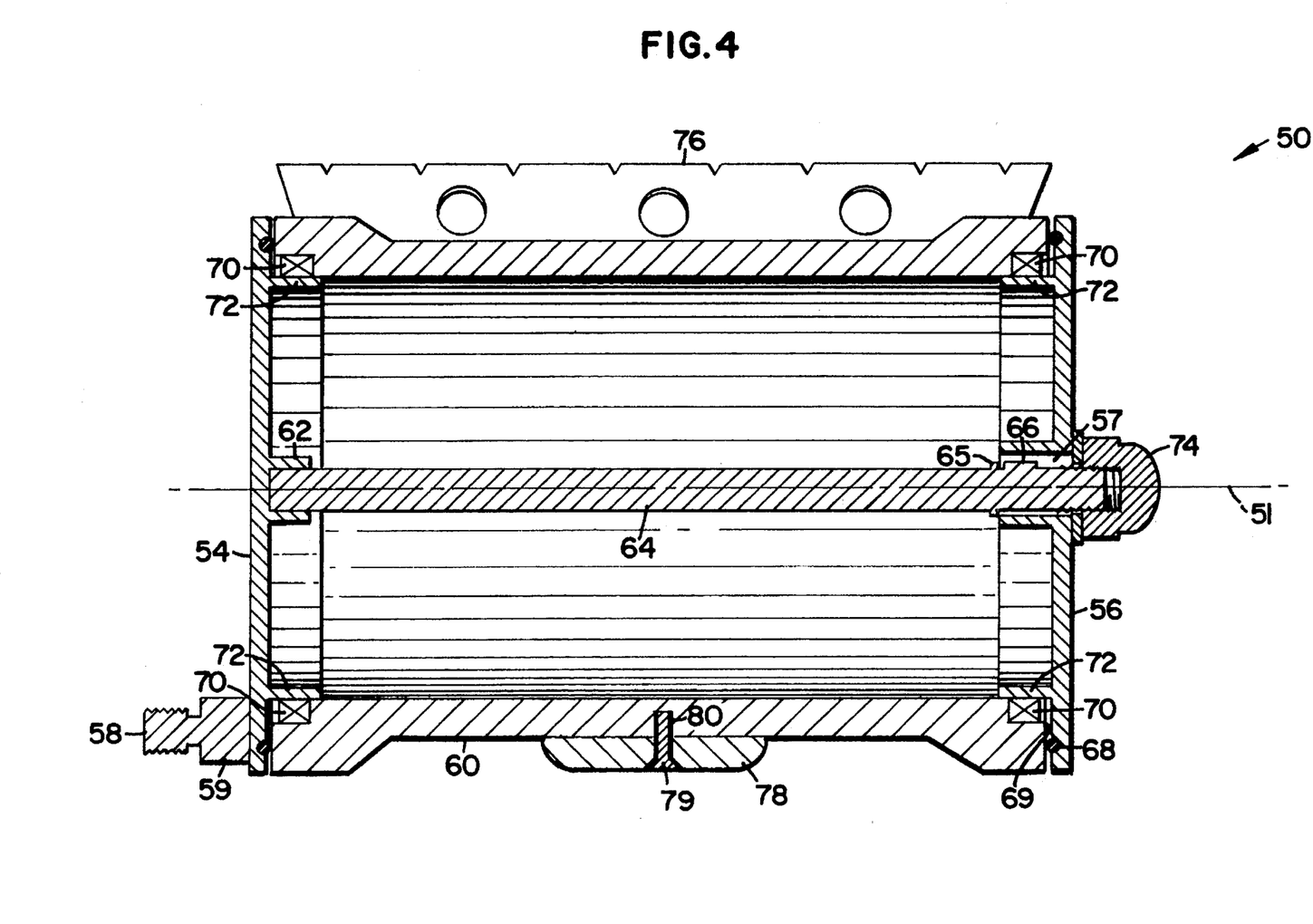
FIG. 4 is a cross-sectional view along line 4—4 in FIG. 3.
Figure 5:
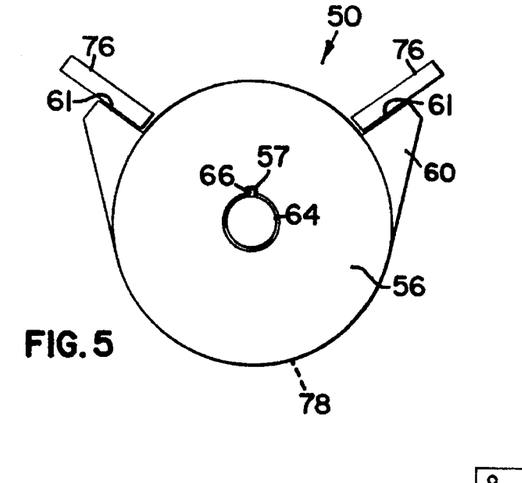
FIG. 5 is a end view of the device of FIG. 3, taken from the opposing end of the device.

FIGS. 3–5 depict one preferred embodiment of a pedal according to the present invention. Turning to FIG. 3, an end view of the pedal 50 is shown as seen from the end attached to the crank arm 10. As shown there, the pedal 50 has a means for mounting which includes a threaded stud 58 which is adapted to be received into a threaded bore 14 found in crank arm 10. Wrench flats 59 are provided on the stud 58 for installation of the pedal 50 on a crank arm 10. The stationary end 54 of the pedal 50 defines the location of axis 51, around which housing 60 rotates.

In the embodiment shown, axis 51 is located at the center of the circle defined by fixed end 54 of the eccentric axle according to the present invention. Surrounding fixed end 54 is housing 60 which rotates about the axis 51 and which supports cage members 76 attached on surfaces 61 formed in the housing 60. The uppermost surfaces of cage members 76 define a plane 77 which cooperate with the foot of a rider during rotation of the crank arm. Cage members 76 and top surface 63 of housing 60 form an outer force engaging surface for pedal 50.

To bias the housing 60 upright with cage members 76 positioned for engagement by the rider, housing 60 preferably includes a weight 78 attached opposite the cage member 76, thereby using gravity to maintain the pedal 50 in a proper orientation (e.g., as shown in FIG. 3 where the axis of rotation 51 is interposed between the outer force engaging surface of the pedal (cage members 75 and top surface 63) and the surface of the ground 2 such that the longest effective crank length is provided proximate the 12 o'clock position). It will be understood that standard toe clips and straps (not shown) could be attached to cage members 76 or that a quick-release system such as those marketed under the tradenames LOOK®, TIME®, etc. could be attached to, or incorporated into, the housing 60 to provide attachment from the rider's foot to the housing 60.

Alternatively, all surfaces of the housing 60 can be adapted to cooperate with the foot of a rider (or the hand of an operator for hand-powered crank arms) with the primary consideration being the elimination of slippage or relative movement between the rider's foot (or hand) and the housing 60. Other designs to overcome the orientation problem could include a housing having a plurality of platforms formed on its outer surface, thus making orientation of the pedal unimportant. It will be understood that a wide variety of pedal-to-foot or hand interfaces could be used with the present invention.

Turning now to FIG. 4, which is a cross-sectional view taken along line 4—4 in FIG. 3, the construction of the pedal 50 is depicted. Threaded stud 58 and wrench flats 59 are shown as attached to the fixed end 54 of the eccentric axle. The distal end 56 of the eccentric axle is shown as attached to the fixed end 54 by a rod 64 which is attached to threaded bore 62 attached to fixed end 54.

The opposite end of rod 64 includes a shoulder 65 and key 66 used to prevent rotation of distal end 56 of the eccentric axle during use. Key 66 does so by cooperating with keyway 57 formed in the distal end 56 of the eccentric axle.

The distal end 56 of the eccentric axle is retained on the threaded rod 64 by nut 74 which threads onto rod 64 as shown.

For the purpose of this description of pedal 50, the term eccentric axle should be read as including the fixed end 54 attached to a crank arm, distal end 56 and rod 64 which connects the ends. Also, although threaded rod 64 which attaches both ends of the eccentric axle is shown as being coaxial with the axis of rotation 51 of the pedal 50, it will be understood that the opposing ends 54 and 56 of the eccentric axle could be attached by a wide variety of mechanical means other than that depicted in FIGS. 3–5. In particular, housing 60 could be redesigned to fit over an eccentric axle machined from a single piece of metal. Also, it will be understood that in designs similar to pedal 50, the connection between axle ends 54 and 56 could be located anywhere within housing 60 and need not be coaxial with axis 51.

As discussed above, the primary consideration with regard to devices constructed according to the present invention is the fixed attachment of an eccentric axle at the end of a crank arm with a housing which rotates about the offset axis 51.

Housing 60 is preferably hollow to reduce the weight of the pedal 50 and preferably includes a pair of roller bearings 70 press-fit into the ends of the housing 60. Roller bearings 70 ride on bearing surfaces 72 formed in the fixed end 54 and distal end 56 of the eccentric axle.

Because the housing 60 rotates relative to the ends 54 and 56 of the eccentric axle, ball bearings 68 are fitted into voids formed in the fixed end 54 and distal end 56 to reduce friction between parts 54 and 56 and the housing surfaces such as 69 as depicted in FIG. 4.

Also shown in FIG. 4 is the attachment of weight 78 to housing 60 by the use of a threaded fastener 79 which cooperates with a threaded bore 80 in the housing 60. It will be understood that weight 78 could be incorporated within the housing 60 or on its exterior as depicted in FIGS. 3–5.

FIG. 5 depicts the pedal 50 shown in FIGS. 3 and 4 from the end opposite that having the threaded stud 58. Nut 74, shown in FIG. 4, has been removed to show the key 66 formed on threaded rod 64 and cooperating keyway 57 formed in the distal end 56 of the eccentric axle.

The materials used to construct the preferred embodiment of the pedal 50 as depicted in FIGS. 3–5 can include many different materials such as aluminum, steel, titanium, plastic composites, etc., which will be well known to those skilled in the art.

Figure 6:
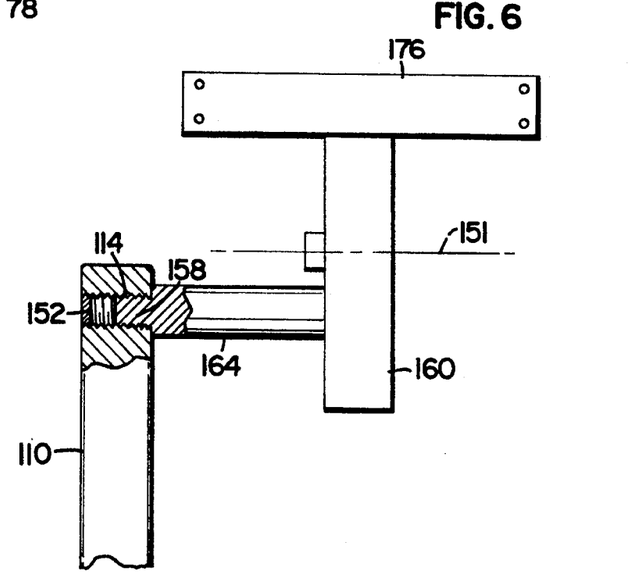
FIG. 6 is a partial cross-sectional view of a third preferred embodiment of a device according to the present invention.

FIG. 6 depicts an alternate preferred embodiment of a pedal 150 constructed according to the present invention. The essential difference between this embodiment and pedal 50 described above is the reduction in size of the housing 160 and eccentric axle 164 which reduces the weight of the pedal 150. Pedal 150 can also be constructed with a single set of bearings, further reducing weight and cost.

FIG. 6 also depicts one method of attaching pedals according to the present invention to crank arms such that no rotation is allowed between the eccentrically mounted axle 164 and the crank arm 110. As shown, the pedal 150 is attached to crank arm 110 through the use of a threaded stud 158 turned into threaded bore 114 on the end of axle 164.

Opposing threaded stud 158 in the threaded bore 114 of crank arm 110 is a threaded plug 152 which can be tightened to oppose the movement of threaded stud 158 into the threaded bore 114. A similar means for mounting is also described above with respect to FIG. 1.

The eccentric axle 164 takes a shape which is substantially disk shaped and is contained within housing 160 which rotates around that portion of the eccentric axle 164. The axis of rotation of housing 160 around the eccentric axle is axis 151 as shown in FIG. 6. Attached to housing 160 are pedal cage members 176 which provide a platform for the foot of a rider.

Figure 7:
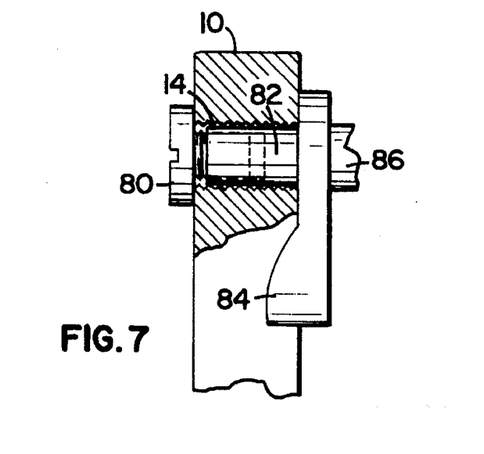
FIG. 7 is an enlarged partial view, in partial cross-section, of a fourth preferred embodiment of a device according to the present invention.

FIG. 7 is a view in partial cross-section of the end of a crank arm 10 with an alternate means of mounting an eccentric axle to prevent movement of the axle 86 (only partially shown) relative to the crank arm 10. In this embodiment, eccentric axle 86 includes a stud 82 which protrudes into the threaded bore 14 of the crank arm 10. A fastener 80 is threaded into the extension 82 and draws it against the crank arm 10. The alignment of the eccentric axle is held constant by the use of wings 84 (only one of which is shown in FIG. 7, but it will be understood that an opposing wing is located on the opposite side of crank arm 10). The wings 84 form a slot which receives crank arm 10 to prevent rotation of the eccentric axle 86 about the crank arm 10 during use.

Figures 8, 9:
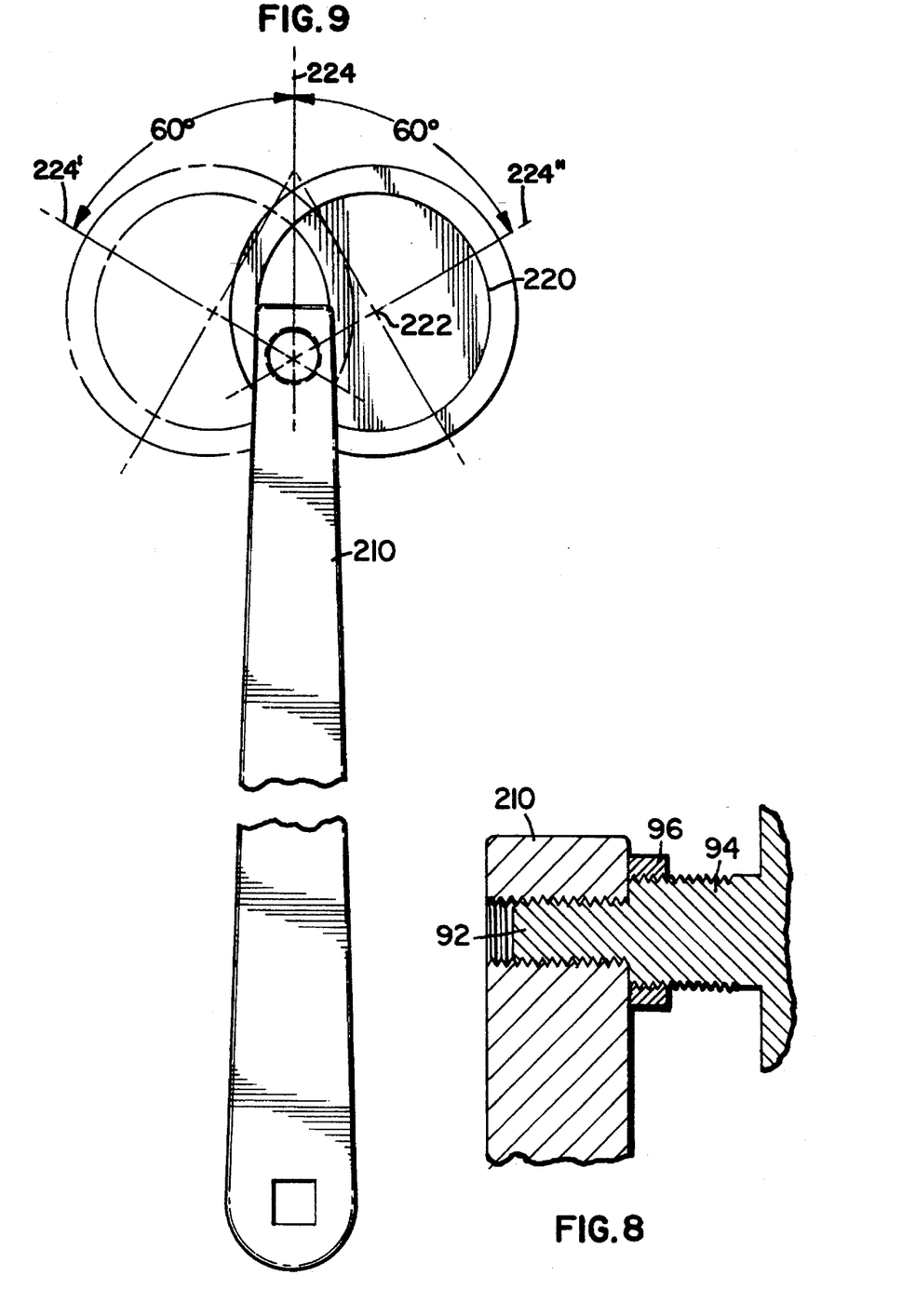

FIG. 8 depicts yet another embodiment of a means for mounting an eccentric axle according to the present invention. In that embodiment, the mounting means includes a threaded stud 92 adapted for threading into a threaded hole 14 as in crank arm 10 (see FIGS. 1, 6 and 7). Also included is a threaded section 94 which is threaded opposite the threading on stud 92 and has a larger diameter than stud 92. Located on threaded section 94 is a locking ring 96.

In use, the pedal assembly 90 is threaded onto a crank arm to the desired relationship between the eccentric axle of the pedal and the crank arm. Once stud 92 is in position, locking ring 96 is turned against the crank arm, thereby locking the pedal 90 in position. In this embodiment, locking ring 96 is preferably provided with wrench flats (not shown) to facilitate tightening of the locking ring 96 against the crank arm.

FIG. 9 is a schematic diagram of the pedal system according to the present invention depicting that the eccentric axle 220 of the present invention need not be mounted exactly along the line of the longitudinal axis of the crank arm 210 to provide the maximum effective crank length when the pedal and crank arm are at the twelve o'clock position.

As shown in FIG. 9, when the crank arm 210 is at the twelve o'clock position, i.e., vertical with respect to a level horizontal plane, the axle 220 can be eccentrically mounted with the axis 222 defined along an offset axis extending between axis 222 and bore 14 in a variety of positions off of the longitudinal axis of the crank arm 210 (e.g., offset axis 224, 224' or 224" in FIG. 9). The preferred range of positions can vary approximately ±60 degrees off of the longitudinal axis of crank arm 210, with a more preferred range lying between ±30 degrees, and a most preferred range lying between ±15 degrees. The exact relationship will be determined by each individual and can even vary between the left and right crank arms on the same bicycle.

The result of the attaching the pedal with the axis 222 of eccentric axle 220 off of the longitudinal axis of crank arm 210 is to either delay or accelerate the onset of the power phase of the pedal stroke. That feature may be beneficial if it is desired to adjust the timing and/or positioning of the power phase of the pedal stroke. As an example, by adjusting the axis 222 of the eccentric axle 220 to be at a position of, for instance, −15 degrees, the power phase of the stroke will be delayed until the crank arm and pedal reach a point at which the rider can begin exerting some tangential force to the circle of rotation defined by the crank arm.

If, oppositely, the eccentric axle 220 is mounted with its axis 222 at +15 degrees, the power phase of the pedal stroke is accelerated because the rider will be able to exert some force to the crank arm 210 before it reaches the 12 o'clock position in the stroke.

It will be understood that the relative relationship between the crank arm 210 and the axis of the eccentric axle 220 will also affect the position at which the crank arm has its minimum effective length similar to the way in which the positioning affects the position of the beginning of the power stroke.

Although specific embodiments have been illustrated and described herein, it will be appreciated by those of ordinary skill in the art that any arrangement which is calculated to achieve the same purpose may be substituted for the specific embodiment and method shown. In particular, although the preferred embodiments described above have been discussed as devices which can be attached to an existing crank arm, it should be understood that a crank arm could be integrated with a device according to the present invention and that such a combination is deemed within the scope of the present invention. This application is intended to cover any other adaptations or variations of the present invention and it is intended that the invention be limited only by the claims and the equivalents thereof.

We claim:

1. A device in combination with a crank arm of the type having a proximal end rotating about a fixed axis, a distal end having a bore, and a fixed crank length defined by a distance between the fixed axis and a centerline through the bore, said device comprising:

an axle defining an axis of rotation;

means for mounting said axle to the crank arm with said axis of rotation offset from the bore of the crank arm at a fixed first distance, said means for mounting maintaining said axis of rotation fixed relative to, and parallel to, the fixed axis of the crank arm;

a housing coupled to said axle and rotating about said axis of rotation, said housing having an outer force engaging surface spaced a fixed second distance from said axis of rotation and fixed relative to said housing; and means for retaining said outer force engaging surface upright relative to a surface of the ground with said axis of rotation interposed between said outer force engaging surface and the surface of the ground.

2. The device of claim 1, wherein said means for mounting further comprises a threaded stud eccentrically mounted on said axle, said threaded stud threading into the bore in the crank arm.

3. The device of claim 2, wherein said means for mounting further comprises a locking ring on said device threaded reverse with respect to said threaded stud, said locking ring abutting the crank arm when said device is locked in position.

4. The device of claim 2, further comprising a threaded plug adapted for threading into the bore in the crank arm opposite from said threaded stud, said threaded plug bearing against an end of said threaded stud to prevent rotation of said axle relative to the crank arm.

5. The device of claim 1, wherein said means for mounting further comprises:

a slotted member attached to said axle, said slotted member having a slot adapted to receive a portion of the crank arm;

a stud coupled to said axle and said slotted member and adapted for protruding into the bore in the crank arm, said stud including a threaded aperture in an end thereof; and a threaded fastener adapted for protruding into the bore opposite from said stud and threading into the threaded aperture in said stud, whereby said threaded fastener and said stud cooperate to fixedly retain said axle on the crank arm.

6. The device of claim 1, wherein said outer force engaging surface is defined on a platform attached to said housing, said platform adapted to cooperate with a foot of a rider during rotation of the crank arm; whereby the device provides an effective crank length which varies during rotation of the crank arm and is the sum of the fixed crank length and said first and second distances when the crank arm is at a twelve o'clock position, the fixed crank length and said first distance at a three or a nine o'clock position, and the fixed crank length and said first distance minus said second distance at a six o'clock position.

7. The device of claim 1, wherein said means for retaining said platform upright comprises a weight attached to said housing diametrically opposite said outer force engaging surface.

8. The device of claim 1, wherein said axle further comprises a fixed end and a distal end joined by a rod.

9. A device in combination with a crank arm of the type having a proximal end rotating about a fixed axis, a distal end having a bore, and a fixed crank length defined by a distance between the fixed axis and a centerline through the bore, said device comprising:

an axle defining an axis of rotation;

means for mounting said axle on the bore of the crank arm with said axis of rotation offset from the bore at a fixed first distance, said means for mounting maintaining said axis of rotation fixed relative to, and parallel to, the fixed axis of the crank arm;

a housing rotatably mounted to said axle to rotate about said axis of rotation;

a platform fixedly attached to said housing, said platform having an outer force engaging surface adapted to cooperate with a foot of a rider during rotation of the crank arm, said outer force engaging surface being spaced a second distance from said axis of rotation wherein the device provides an effective crank length which varies during rotation of the crank arm and is the sum of the fixed crank length and said first and second distances when the crank arm is at a twelve o'clock position, the fixed crank length and said first distance at a three or a nine o'clock position, and the fixed crank length and said first distance minus said second distance at a six o'clock position; and wherein said housing is weighted to retain said outer force engaging surface of said platform upright relative to a surface of the ground with said axis of rotation interposed between said outer force engaging surface and the surface of the ground.

10. A device in combination with a crank arm of the type having a proximal end rotating about a fixed axis, a distal end having a bore, and a fixed crank length defined by a distance between the fixed axis and a centerline through the bore, said device comprising:

(a) an axle defining an axis of rotation;

(b) means for mounting said axle to the crank arm with said axis of rotation offset from the bore of the crank arm at a fixed first distance, said means for mounting maintaining said axis of rotation fixed relative to, and parallel to, the fixed axis of the crank arm;

(c) a housing coupled to said axle and rotating about said axis of rotation, said housing including a platform fixedly attached thereto, said platform having an outer force engaging surface spaced a fixed second distance from said axis of rotation and adapted to cooperate with a foot of a rider during rotation of the crank arm; and (d) means for retaining said outer force engaging surface upright relative to a surface of the ground with said axis of rotation interposed between said outer force engaging surface and the surface of the ground, said means for retaining said outer force engaging surface upright including a weight attached to said housing diametrically opposite said outer force engaging surface.

11. A pedal crank assembly, comprising:

(a) a crank arm having a proximal end and a distal end, wherein said proximal end is rotated about a fixed axis;

(b) an axle defining an axis of rotation;

(c) means for mounting said axle at said distal end of said crank arm with said axis of rotation spaced apart from said distal end of said crank arm and stationary with respect to said crank arm;

(d) a housing rotatably mounted to said axle to rotate about said axis of rotation, said housing having an outer force engaging surface spaced a fixed distance from said axis of rotation and fixed relative to said housing; and (e) means for retaining said force engaging surface upright relative to a surface of the ground with said axis of rotation interposed between said outer force engaging surface and the surface of the ground.

12. The assembly of claim 11, wherein said crank arm includes a bore at the distal end thereof and a fixed crank length defined by a distance between said fixed axis and a centerline through said bore, and wherein said means for mounting said axle includes means for securing said axle to said crank arm through said bore with said axis of rotation offset a fixed distance from said bore along an offset axis extending between said bore and said axis of rotation.

13. The assembly of claim 12, wherein said offset axis lies along a longitudinal axis of said crank arm.

14. The assembly of claim 12, wherein said offset axis lies within a range of ± 60 degrees relative to a longitudinal axis of said crank arm.

15. The assembly of claim 12, wherein said offset axis lies within a range of ± 30 degrees relative to a longitudinal axis of said crank arm.

16. The assembly of claim 12, wherein said offset axis lies within a range of ±15 degrees relative to a longitudinal axis of said crank arm.

17. A device in combination with a bicycle crank arm of the type having a proximal end rotating about a fixed axis, a distal end having a bore, and a fixed crank length defined by a distance between the fixed axis and a centerline through the bore, said device comprising:

(a) an axle defining an axis of rotation;

(b) means, eccentrically mounted on said axle, for mounting said axle on the bore of the crank arm with said axis of rotation fixed relative to, and parallel to, the fixed axis of the crank arm and offset from the bore at a fixed first distance;

(c) a housing rotatably mounted to said axle to rotate about said axis of rotation; and (d) an outer force engaging surface defined on at least a portion of said housing and adapted to cooperate with a foot of a rider during rotation of the crank arm, said outer force engaging surface being spaced a second distance from said axis of rotation with said axis of rotation interposed between said outer force engaging surface and the surface of the ground in operation, the outer force engaging surface facing away from the axis of rotation;

wherein said device provides an effective crank length which varies during rotation of the crank arm and is the sum of the fixed crank length and said first and second distances when the crank arm is at a twelve o'clock position, the fixed crank length and said first distance at a three or a nine o'clock position, and the fixed crank length and said first distance minus said second distance at a six o'clock position.

* * * * *

UNITED STATES PATENT AND TRADEMARK OFFICE
CERTIFICATE OF CORRECTION

PATENT NO. : 5,553,515

DATED : September 10, 1996

INVENTOR(S) : Young Man Yang et al.

It is certified that error appears in the above-identified patent and that said Letters Patent is hereby corrected as shown below:

On column 3, line 41, please insert --Fig. 9 is a diagram depicting the range of relative positions available between the device according to the present invention and the longitudinal axis of a crank arm.-- after the word "invention."

On column 5, line 40, please delete "75" and substitute therefore --76--

On column 10, line 26 (claim 11), please insert --wherein said axis of rotation is parallel to said fixed axis-- after the word "arm"

Signed and Sealed this

Fifteenth Day of July, 1997

*Attest:*

BRUCE LEHMAN

*Attesting Officer*     *Commissioner of Patents and Trademarks*